United States Patent
Lloyd et al.

(10) Patent No.: US 10,460,014 B2
(45) Date of Patent: *Oct. 29, 2019

(54) SCROLLING IN LARGE HOSTED DATA SET

(71) Applicant: Google Inc., Mountain View, CA (US)

(72) Inventors: Zachary Erik Lloyd, Brooklyn, NY (US); Dennis Julian Lee, New York, NY (US); Nick Santos, Brooklyn, NY (US); Yoah Bar-David, Kfar Hes (IL)

(73) Assignee: GOOGLE LLC, Mountain View, CA (US)

( * ) Notice: Subject to any disclaimer, the term of this patent is extended or adjusted under 35 U.S.C. 154(b) by 1393 days.

This patent is subject to a terminal disclaimer.

(21) Appl. No.: 13/846,199

(22) Filed: Mar. 18, 2013

(65) Prior Publication Data

US 2013/0219256 A1   Aug. 22, 2013

Related U.S. Application Data

(63) Continuation of application No. 13/084,951, filed on Apr. 12, 2011, now Pat. No. 8,429,521.

(60) Provisional application No. 61/323,206, filed on Apr. 12, 2010.

(51) Int. Cl.
G06F 17/00 (2019.01)
G06F 17/22 (2006.01)
G06F 17/24 (2006.01)

(52) U.S. Cl.
CPC ........ *G06F 17/2247* (2013.01); *G06F 17/246* (2013.01)

(58) Field of Classification Search
CPC .................................................... G06F 17/246

USPC ......................................... 715/212, 234, 200
See application file for complete search history.

(56) References Cited

U.S. PATENT DOCUMENTS

| | | |
|---|---|---|
| 5,557,722 A | 9/1996 | DeRose et al. |
| 6,988,241 B1 | 1/2006 | Guttman et al. |
| 7,017,112 B2 | 3/2006 | Collie et al. |
| 7,213,199 B2 | 5/2007 | Humenansky et al. |
| 7,506,242 B2 | 3/2009 | Kotler et al. |
| 8,261,206 B2 * | 9/2012 | Bennett .................. G06F 3/0481 715/764 |

(Continued)

FOREIGN PATENT DOCUMENTS

WO   2005015910 A1   2/2005

OTHER PUBLICATIONS

Raman, T.V., "Cloud Computing and Equal Access for All," Int'l World Wide Web Conference. xx, xx, No. 17th, pp. 1-4, XP002641101 (Apr. 21, 2008).

(Continued)

*Primary Examiner* — Manglesh M Patel
(74) *Attorney, Agent, or Firm* — Lowenstein Sandler LLP

(57) ABSTRACT

A computer-implemented method of presenting an electronic document via a web browser includes maintaining on a computing device a client data model of the electronic document, the client data model comprising data that defines content of the electronic document and formatting of the content of the electronic document, and rendering a first sub-portion of content of the electronic document from the client data model to a document object model (DOM) for the web browser. The method also includes providing the DOM to the web browser, for the web browser to display a view of the electronic document from the DOM.

19 Claims, 7 Drawing Sheets

(56) References Cited

U.S. PATENT DOCUMENTS

| | | | |
|---|---|---|---|
| 8,549,439 B2* | 10/2013 | Howard ............ | G06F 17/30241 715/721 |
| 2003/0014406 A1 | 1/2003 | Faieta et al. | |
| 2005/0273695 A1* | 12/2005 | Schnurr ................ | H04W 24/00 715/213 |
| 2007/0236508 A1 | 10/2007 | Lawler et al. | |
| 2008/0079972 A1 | 4/2008 | Goodwin et al. | |
| 2008/0301643 A1* | 12/2008 | Appleton ................ | G06Q 30/02 717/124 |
| 2010/0205520 A1 | 8/2010 | Parish et al. | |
| 2011/0197124 A1* | 8/2011 | Garaventa ......... | G06F 17/30893 715/234 |
| 2011/0252299 A1 | 10/2011 | Lloyd et al. | |
| 2011/0252335 A1 | 10/2011 | Lloyd et al. | |
| 2012/0117452 A1 | 5/2012 | Lloyd et al. | |

OTHER PUBLICATIONS

Anonymous, "When do browsers start to render partially transmitted HTML?", Retrieved from the internet on Sep. 29, 2011: URL:http://stackoverflow.com/questions/2203751/when-do-browsers-start-to-render-partially-transmitted-html XP002660225, 8 pages, (Feb. 5, 2010).

Resig, J., "DOM Document Fragments," retrieved from the internet on Sep. 28, 2011: URL:http://ejohn.org/blog/dom-documentfragmnets/. XP002660226, 3 pages (Jul. 21, 2008).

Miller, M. (ed), "Collaborating on Word Processing," Chapter II In Cloud Computing: web-Based Applications That Change the Way You Work and Collaborate Online, [Safari Tech Books Online], XP-002641103, pp. 147-164, Que: Indianapolis, Ind. (Aug. 11, 2008).

PCT International Search Report and Written Opinion for International Application No. PCT/US2011/032056 dated Oct. 11, 2011, 8 pages.

PCT International Preliminary Report on Patentability for International Application No. PCT/US2011/032056 dated Oct. 16, 2012, 5 pages.

European Patent Office, Communication Pursuant to Article 94(3) for Application No. 11717823.6, dated Dec. 6, 2017, 6 pages.

\* cited by examiner

SCROLLING IN LARGE HOSTED DATA SET

CROSS-REFERENCE TO RELATED APPLICATIONS

This application is a continuation of U.S. patent application Ser. No. 13/084,951, filed on Apr. 12, 2011, the entire contents of which are hereby incorporated by reference, and claims priority to U.S. Provisional Application Ser. No. 61/323,206, filed on Apr. 12, 2010, entitled "Scrolling in Large Hosted Data Set," the entire contents of which are hereby incorporated by reference.

TECHNICAL HELD

This document relates to systems and techniques for managing movement by a user in a large electronic document that is being served by a hosted computer system.

BACKGROUND

More and more, people are working in the cloud. Cloud computing generally involves the use of hosted services, which are computer applications and other services that are served from a publicly available system over the internet, generally to applications that in turn execute inside web browsers or execute as web apps that are dependent on receiving data and other information from the hosted systems. Cloud computing can provide the benefit of data that follows a user wherever the user can find a network connection, such as on a home computer, a work computer, in an internet café, on a smartphone, or elsewhere. In addition, hosted services generally implement much of their functionality from the server side, so that updates and bug fixes can be rolled out more easily than in situations in which large client-side applications must be updated on many different client computers.

Web applications that execute within a web browser can have the benefits of a consistent user interface, and the ability to execute without complicated downloads of application code (e.g., applications can run simply by providing the browser with links that point to JavaScript or other similar code). However, such consistency can impose limits on flexibility in how applications are presented to users, and can also limit performance of applications.

SUMMARY

This document describes systems and techniques that may be used to present large-sized data models to a user of a web application, such as large spreadsheets that a user interacts with via a web browser, where only a small portion of a spreadsheet can be viewed by the user at any given time so that the user needs to pan or scroll through the spreadsheet (or other type of document). In general, a model-view-controller (MVC) approach is used in which the entire spreadsheet or other such document is stored and managed in a model, and, depending on the part of the model the user is currently trying to view, portions of the model may be rendered into a document object model (DOM) for the browser and may be provided in the view of the model. The view to be placed in the DOM may be determined to include the area of the spreadsheet the user can currently see on her display plus a buffer area around the periphery of the currently viewable area. Thus, if the user scrolls slightly, her display may be updated immediately from the view in the DOM, and if the scrolling occurs to a sufficient degree, the view in the DOM may be updated by fetching and rendering additional portions of the model, so as to maintain a sufficient rendered area in the DOM around the user's current viewport so that the user can scroll smoothly with little latency.

In some cases, particularly when the model is very large (e.g., thousands of rows and thousands of columns in a spreadsheet), two versions of the model may be maintained. A first version may store the entire model at the hosted server system. A second version may store a subset of the model on a client that executes the browser application, where the view can be generated from the second model on the client, and the view may be a further subset of the portion of the document represented by the second model. Thus, when a user establishes a location for a viewport on a model (i.e., the virtual window the user is looking at the model through), the actual display to the user may correspond to a smallest subset of the model, and the DOM may correspond to a next-larger subset of the model (though both would be a rendering of the model that is more static than is the model itself). A model stored on the client device with the browser may correspond to yet a larger sub-set of the model, and a version of the entire model may be stored at the hosted server system (although the actual model on the client and the model on the server system may be the same in alternative implementations).

Coordination of the models, and user interaction with the models (via rendered versions of the models), may be handled by a controller component. The controller may intercept and interpret keystrokes, selections on a web page, and other user interactions, and may cause the web-based application to respond appropriately to such interactions. For example, synthetic scroll bars may be constructed in the view (e.g., around a perimeter of the viewport of the model) to give a user the proper impression about the portion of the model that they are currently viewing. When a user clicks on a graphical element that represents a handle, or slider, in one of the scroll bars (or presses a down, up, right, or left arrow key enough times), the controller can interpret the input and may cause other portions of the model to be rendered into the DOM so that the portion of the spreadsheet that is displayed to the user is updated so as to correspond to whatever scrolling input the user provided to the application.

In certain implementations, such systems and technique may provide one or more advantages. For example, web-based applications can be executed from various types of computers without having to install full application software in many instances. Also, web-based applications may provide for improved collaboration in which multiple users manipulate and edit a document simultaneously. The features described here may provide such benefits of a web-based or browser-based applications, but with user interface benefits of a native application, such as smooth scrolling in a very large document (e.g., a spreadsheet).

In one implementation, a computer-implemented method of presenting an electronic document via a web browser is disclosed. The process comprises maintaining on a computing device a client data model of the electronic document, the client data model comprising data that defines content of the electronic document and formatting of the content of the electronic document; rendering a first sub-portion of content of the electronic document from the client data model to a document object model (DOM) for the web browser; and providing the DOM to the web browser, for the web browser to display a view of the electronic document from the DOM. The view of the DOM displayed by the web browser can comprise a second sub-portion that is a sub-portion of the first sub-portion. Also, the electronic document can comprise a spreadsheet and the content can comprise content for cells in the spreadsheet. One or more cells in the first sub-portion of content can define one or more formulas, and rendering the one or more cells can comprise converting each of the one or more formulas to a literal value.

In certain aspects, rendering the first sub-portion of content comprises generating an HTML table that, when displayed, visually represents the data in the client data model for the sub-portion of content. The method can also include identifying a buffer area of cells around cells that are in the view of the DOM, determining a bounding range for the buffer area, and rendering cells in the model within the bounding range. In addition, maintaining the client data model of the electronic document can comprise downloading a data model of the electronic document from a remote server system, and communicating with the remote server system so that changes made by a user of the computing device to the electronic document are reflected in a version of the data model that is stored at the remote server system. The method can also include displaying the spreadsheet as an hypertext mark-up language (HTML) table element.

The method may additional include receiving a user input in a displayed cell of the spreadsheet, and writing the user input back to the first model. In addition, the method can comprise transmitting information regarding the user input to a remote server system to coordinate the first model with a model maintained by the remote server system. The method may further include displaying the view of the electronic document from the DOM along with visual elements with which a user may interact to affect the display of the view of the electronic document. Such a method may additional comprise receiving a user selection on a visual element for scrolling across the electronic document, determining a bounding range for a portion of the model that corresponds to the user selection, and rendering into the DOM content in the model that is within the bounding range. Moreover, the bounding range can be asymmetrical around a current view of the electronic document and can be biased in a direction toward a direction in which the user has most recently scrolled the electronic document, so that DOM includes more area on a first side of the current view than on a second side of the current view that is opposed to the first side.

In another implementation, a computer-implemented system for presenting an electronic document via a web browser executable on a computing device is disclosed. The system includes a first electronic document model that defines an electronic document; a view of the electronic document model that comprises a document object model (DOM) as a rendered representation of a sub-portion of content in the electronic document model, and is arranged to be displayed by the web browser; and a controller to interpret user interactions with a display of the view of the electronic document model, and to cause different sub-portions of the electronic document object model to be displayed in coordination with the user interactions. A displayed portion of the first electronic document model can comprise a sub-portion of the DOM, which comprises a sub-portion of the first electronic document model. Also, the first electronic document model can comprise a spreadsheet and the content can comprise cells in the spreadsheet. In addition, one or more cells in the first sub-portion of content may define one or more formulas, and the rendered representation may comprise literal values of outputs of the formulas. Moreover, the rendered representation can comprise an HTML table that, when displayed, visually represents the data in the first electronic document model for the sub-portion of the content.

In certain aspects, the system is programmed to identify a buffer area of cells around cells that are in the view of the DOM, determine a bounding range for the buffer area, and render cells in the first electronic document model within the bounding range. Also, the view and the browser can interact to display the spreadsheet as a hypertext mark-up language (HTML) table element. The controller can be programmed to receive a user input in a displayed cell of the spreadsheet, and cause the user input to be written to the first model. Also, the controller can be further programmed to cause information regarding the user input to be transmitted to the hosted server system to coordinate the first model with a second model maintained by the hosted server system.

In some aspects, the system further comprises a second electronic document model at a hosted server system that is a super-set of the first electronic document model, and wherein the system is programmed to communicate with the hosted server system to fetch portions of the second electronic document model that surround a current user location in the document. The system can be programmed to communicate with the hosted server system so that changes made by a user in the document are reflected in a version of the second data model. In addition, the system can be programmed to display the view of the electronic document from the DOM along with visual elements with which a user may interact to affect the display of the view of the electronic document. Moreover, the system can be further programmed to receive a user selection on a visual element for scrolling across the electronic document, determining a bounding range for a portion of the first electronic document model that corresponds to the user selection, and rendering into the DOM content in the first document model that is within the bounding range.

In yet another implementation, a computer-implemented system for presenting an electronic document via a web browser executable on a computing device is disclosed. The system includes a first electronic document model that defines an electronic document, a view of the electronic document model that comprises a document object model (DOM) as a rendered representation of a sub-portion of content in the electronic document model, and is arranged to be displayed by the web browser, and means for causing sub-portions of the first electronic document model to be rendered into the DOM in response to user interaction that scrolls a display of the electronic document.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for visually presenting large-sized data models to web application users. Such systems and techniques may include an application that operates in a web browser, where the application can enable a user to interact with a large document that is represented by a data model. Through the application interface, for example, a relatively small portion of the document may be accessible to the user at any given time, and the user may pan or scroll through the document to reveal additional document portions that are associated with additional data.

In general, a model-view-controller (MVO) approach may be used for storing, managing, accessing, and presenting document data. Depending on the part of the data model that the user attempts to access, portions of the model may be rendered for the web browser (e.g., in a DOM that is presented by the browser) and may be provided to the view. The controller can handle coordination between the model and the view, and can handle interactions with the user. Such an approach may combine the benefits of a web-based or browser-based application (such as the ability to run the application from various types of computers without having to install full application software) with the benefits of a native application (such as responsive and flexible user interface behavior).

Figure 1:
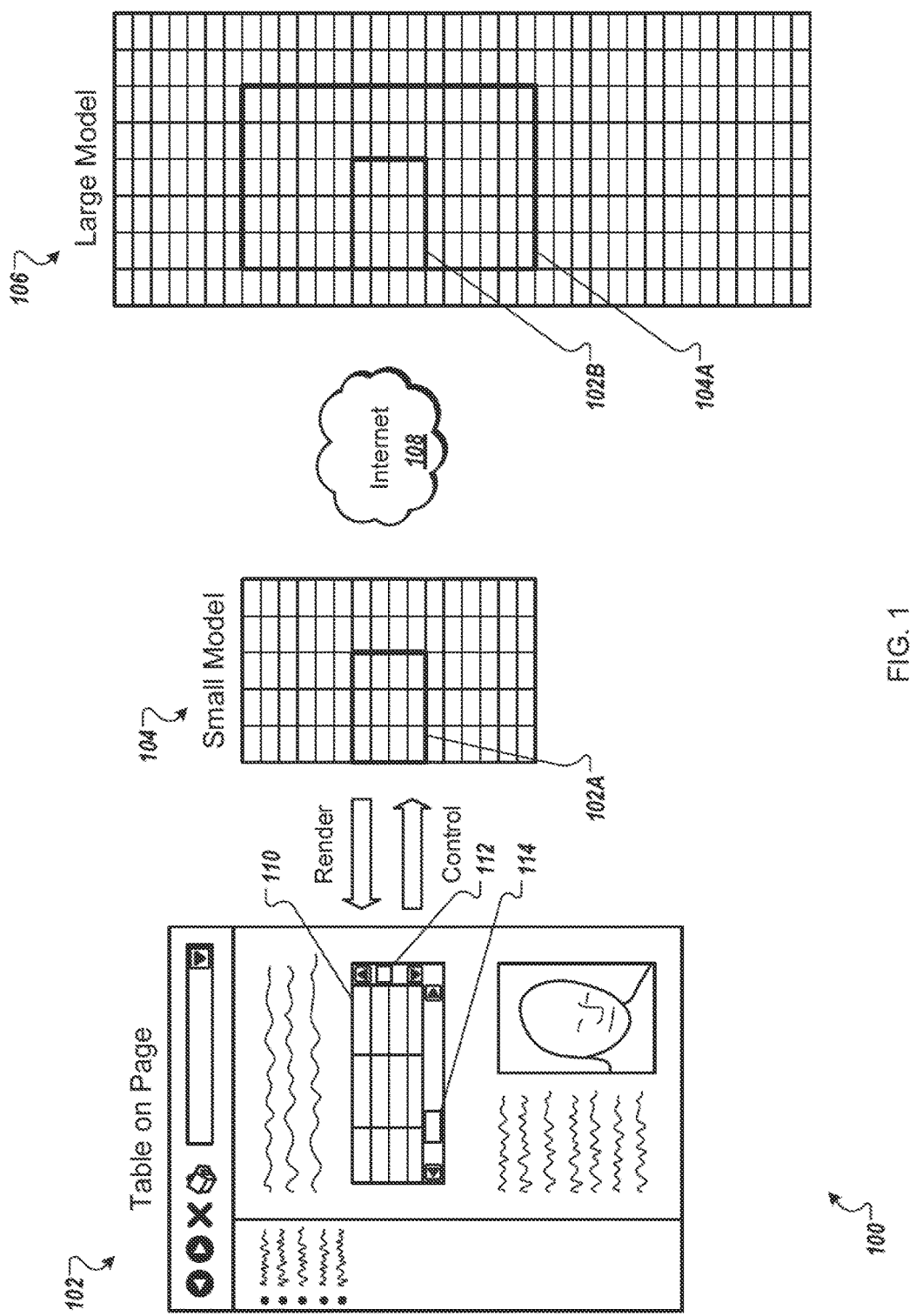
FIG. 1 is a conceptual diagram of a system for managing display and interaction with a browser-based spreadsheet application.

FIG. 1 is a conceptual diagram of a system 100 for managing display and interaction with a browser-based spreadsheet application. In general, the system 100 includes a web browser 102 that is executed on a computing device. The web browser 102 may present to the user a webpage that includes any number of widgets or applications, such as an application for presenting an electronic document 110. As shown in FIG. 1, the electronic document 110 can visually display information related to a content sub-portion 102A of data included in a small data model 104, that may in turn be generated from a large data model 106. The terms "small" and "large" here are used to indicate that one of the models is the same as or a sub-set of the other model, and does not imply absolute sizes on either model.

For example, the small data model 104 can be stored on a client computing device that is executing the web browser 102, and can include data that defines the content of the electronic document 110 and formatting of the content, such as data and meta data in the form of presentation attributes. The large data model 106 can be stored on a server system that is remote from the client device and that provides model data to any number of client computing devices via a network 108, such as the internet. In some implementations, the remote server system that stores, maintains, and provides the large data model 106 may also provide web-based applications and widgets for interacting with the model data. In some implementations, web-based applications/widgets and model data may be provided by different entities—for example, HTML and JavaScript for an application may be served from a first web domain, and model data may be accessed from a second web domain that differs from the first web domain. As the system 100 can be configured to enable any appropriate number of users running web browsers to access information associated with the large data model 106, multiple users may interact with the model data for a single model substantially simultaneously. For example, data changes made by one user of the system 100 can be propagated to any number of other users, so that concurrent editing of a document may occur.

In some cases, a portion of the large data model 106 may be provided, via the network 108, to a client device that is executing the web browser 102. For example, if the model 106 includes more than a certain amount of data, the remote server system can identify a subset 104A of the model 106 for download to the client device. As shown in FIG. 1, the small data model 104 may be generated from the subset 104A. In some cases, the large model 106 may be provided to the client device in its entirety. In some implementations, a determination of whether to provide the subset 104A of the large data model 106 or to provide the large data model 106 in its entirety may be based at least in part on capabilities of the client device requesting the data. For example, a client device that has a relatively small amount of processing power, memory, or storage may be provided with the subset 104A, and a client device that has a relatively large amount of processing power, memory, or storage may be provided with the entire large data model 106. As another example, a client device that has a relatively small amount of processing power, memory, or storage may be provided with a reduced version of subset 104A, and a client device that has a relatively large amount of processing power, memory, or storage space may be provided with an expanded version of subset 104A. In some implementations, additional factors such as communication speeds between the client device and the remote server system and a number of users simultaneously interacting with the large model 106 may be used to determine attributes of the subset 104A, such as its size and updatability.

In some cases, a portion of the small model 104 may be rendered and provided to the web browser 102. For example, a browser application can identify a content sub-portion 102A included in the small model 104 and render the sub-portion 102A into a document object model (DOM), which may be the same extent as, or a super-set of, the view or viewport of the electronic document 110. Using information associated with the DOM, for example, the web browser 102 can present to the user a view of the electronic document 110 via a viewport. Generally, the electronic document 110 may be any sort of document that provides information visually, such as a graphics document, a presentation having discrete slides, a word processing document, a spreadsheet document, or another sort of document. In some implementations, the electronic document 110 can include a spreadsheet table and document content can include cells in the spreadsheet.

The rendering of the model may effect a number of changes on the data in the model. For example, formulas in cells of a spreadsheet may be carried out (executed) and may be replaced in the DOM representation by a literal value (e.g., a simple integer). Also, formatting of text in a table element that implements the view of the spreadsheet may occur, and the rows and columns of the cells may be adjusted so as to match such formatting (e.g., font size, and the like).

Aside from the presentation of the model data itself, visual elements such as user controls (e.g., selectable on-screen icons) may be provided by the web browser 102 or by the browser application that presents the electronic document 110, so as to enable a user to work with the document 110. For example, the electronic document 110 can be associated with a vertical scrollbar 112 and a horizontal scrollbar 114. Also, various icons can be generated around the view of the document 110, in a manner that makes an application that displays the document 110 in a web browser, have all the user interface attributes of a full-featured application (e.g., icons for bolding text, underlining, italicizing, changing font types and sizes, and the like).

In some implementations, the scrollbars 112, 114 can be synthetically constructed—i.e., built from simple image elements that are selected so as to visually represent underlying substantive relationships of objects in the system—and can provide feedback to the user regarding a relationship between the current document view and the large data model 106. For example, based the amount of data and the structure of data included in the large data model 106, the scrollbars 112, 114 can be constructed so as to communicate to the user where she is in the greater model and how big the model is, such as by sizing the thumbs to implement proportional scrollbars, and to position the thumbs at the appropriate locations in the scroll bars that correlate to the positions (X and Y) within the model that the viewport is displaying. As shown in FIG. 1, for example, the proportional positions of thumbs (also known as handles) included in the scrollbars 112, 114 may correspond with the relative position of a content sub-portion 102B within the large data model 106 (e.g., near the left edge and slightly above the middle). The thumbs may be implemented, for example, using HTML DIV elements.

By interacting with the controls (e.g., the thumbs of the scrollbars 112, 114), the user may affect the display of the view of the document 110. For example, as a user selects or moves a graphical element representing a thumb included in one of the scrollbars 112, 114, an application controller component that is operating within the web browser 102 may interpret the input and may cause other portions of the model data to be rendered into the DOM. Based on the user selection or movement, for example, the application controller can determine a bounding range for a portion of the model data that corresponds to the user selection (or movement), and can render into the DOM content within the bounding range. Thus, the portion or the document 110 displayed to the user may be updated to correspond with scrolling input provided to the application by the user.

In some implementations, other types of controls may be provided for receiving user input related to the portion of the electronic document 110 to be displayed. For example, a document map may be provided in association with the document 110, along with a superimposed outline for a future view as a user navigates over the map, enabling the user to visualize an overview of the document 110 and to select a desired portion for closer viewing. In some implementations, other forms of user input may be intercepted and interpreted by the application controller. For example, keystrokes such as arrow keys, page up/down keys, tab keys, and enter keys can be employed by a user for navigation through the document.

In some implementations, the DOM may include content for a buffer area around the periphery of the viewable area, or viewport, of the electronic document 110. For example, the content sub-portion 102A rendered to the DOM can include another sub-portion used for generating the current document view, and can include additional buffer data for spreadsheet cells around the current viewport that is displayed to the user. If the user scrolls through the document 110 to a small degree, for example, and the resulting document position indicated by the user still falls within the sub-portion 102A the display may be updated immediately using the data already in the DOM, without a need to render additional cells form the model into the DOM. Thus, small movements through the document 110 may be accomplished with little processing. If the user scrolls through the document to a larger degree, for example, such that the resulting document position indicated by the user falls outside of the sub-portion 102A, yet is still within the small data model 104 (or the user moves at a rate in a particular direction and speed so as to indicate that additional portions of the model will need to be rendered soon), additional model data can be rendered into the DOM (and perhaps fetched form the server system) from the small data model 104. If the user scrolls through the document to an even larger degree, for example, such that the resulting (or predicted to occur soon) document position indicated by the user falls outside of the small data model 104, additional model data can be provided by the large data model 106. For example, the small model 104 can be updated with data associated with the large data model 106 downloaded from the remote server system, the sub-portion 102A can be repositioned, the DOM can be re-rendered, and the view of the electronic document can be refreshed.

In some implementations, buffer data may be rendered into the DOM and the current view of the electronic document 110 can be refreshed opportunistically, such as at times when the controller is not otherwise handling user input. Thus, document navigation performed by the user may have a smooth appearance, such that data is rendered in advance for areas that are expected to be viewed potentially soon by the user.

The buffer or bounding range around the view of the electronic document may be configured in a number of different ways. In some implementations, the buffer or bounding range around the view may be symmetric. For example, an equal amount of data around each edge of the periphery of the view can be maintained (though it may be equal above and below, and on each side, but unequal as between the top/bottom on the one hand, and the sides on the other). In some implementations, the buffer or bounding range around the view may be asymmetric. For example, the application controller may determine the direction in which the user has most recently scrolled in the electronic document 110, and may render more buffer data into the DOM that corresponds with the leading edge of the direction of the scroll, as compared with the amount of buffer data rendered into the DOM corresponding with the trailing edge. Such an asymmetric rendering may reflect an assumption that the user is most likely to keep scrolling in a particular direction, so that data ahead of the scrolling is fetched to a degree greater than that behind the scrolling. As another example, the buffer area may have a teardrop shape, such that a significant amount of buffer data is maintained ahead of the direction of the scroll, as well as in the trail of the scroll. Thus, if a user continues forward scrolling, slightly changes the trajectory of forward scrolling, or reverses scroll direction, the view may be immediately updated from the DOM.

Particular non-standard examples of user input may be handled in special manners so as to maintain an appropriate user interface. For example, where fast scrolling over long distances in the model occurs, a controller may hold off fetching or rendering other portions of a model until a user's scrolling stops or slows down. In such a situation, the initial model on the client may be entirely replaced with a new portion of the main server-based model. Also, during scrolling, a map (which shows the entire model, overlaid with a rectangle that represents the current viewport) may be displayed in place of a spreadsheet grid or superimposed over the grid.

Figure 2A:
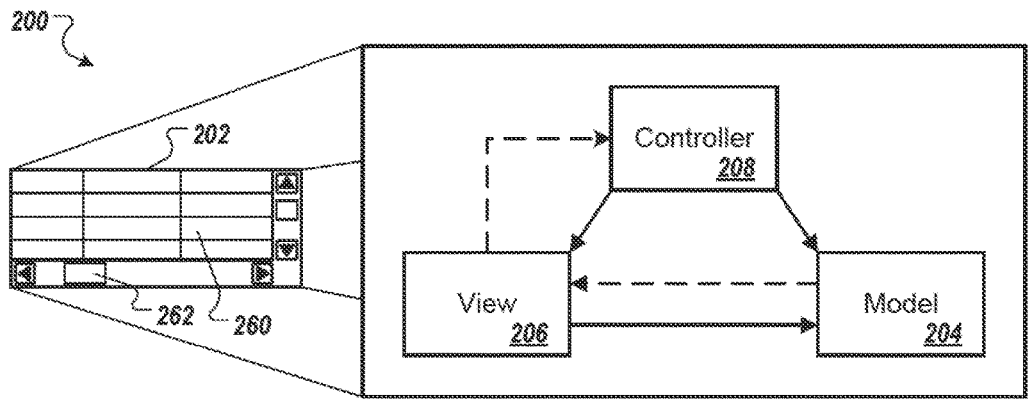
FIGS. 2A and 2B are block diagrams showing components of a model-view-controller implementation of a spreadsheet application.
Figure 2B:
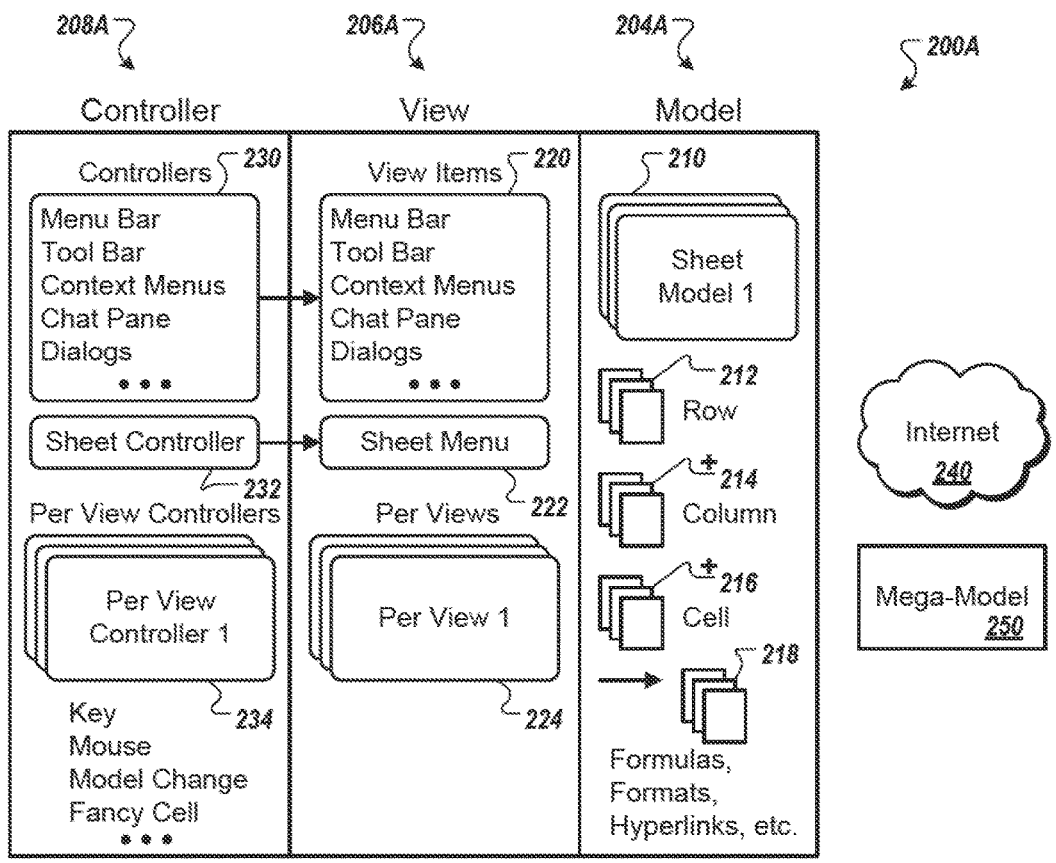

FIGS. 2A and 2B are block diagrams showing components of a model-view-controller (MVC) implementation of a spreadsheet application. For example, the spreadsheet application may be executed by a web browser, such as the web browser 102 shown in FIG. 1. In general, the MVC implementation provides for the download of a model from a remote server to a client, and the rendering of the client into a DOM to form a view of the model that may be managed directly by the web browser. The controller may intercept actions, such as clicks on icons and keystrokes on a keyboard, and may cause such actions to be implemented, such as by adding typed characters both to the model on the client and on the remote server.

Referring to FIG. 2A, a computer application 200 may be configured to display a spreadsheet document 202. The application 200 includes a model 204, a view 206, and a controller 208. For example, the model 204 can contain a representation of the state of the spreadsheet document 202, including such elements as values, formats, formulas, frozen columns, hidden columns, frozen rows, hidden rows, and the like. The view 206 can represent a rendering of the current state of the model 204. For example, the view 206 can be used for presenting to the user visual information that is associated with the spreadsheet document 202, such as user controls and spreadsheet data. The controller 208 can respond to changes in the model 204 or the view 206, and can update the state of the model 204 and the view 206. As shown in FIG. 2A, solid lines between the model 204, the view 206, and the controller 208 represent direct references between components, and dashed lines represent listeners. For example, listening for user interaction (e.g., provided by user controls) with the presentation of the view 206, the controller 208 can modify the model 204, and can in turn modify the view 206. As another example, listening for changes in the model 204 made by another user in a collaborative environment or changes made through an automated data update or another such process, the view 206 can request re-rendering of an updated model or portion of the model. For example, if a user of a client device is only one of multiple users concurrently editing a document, characters and other edits by the other users may be passed to the client device from the server system, and the client code may add characters to the model in near real-time, and those changes can be passed into the DOM—so that each user can see the edits made by the other users very quickly.

Referring to FIG. 2B, the model-view-controller implementation as presented in FIG. 2A is shown with additional detail. As shown, a computer application 200A includes a model 204A (corresponding with the model 204), a view 206A (corresponding with the view 206A), and a controller 208A (corresponding with the controller 208A).

The model 204A can include one or more sheet models 210. Each of the sheet models 210 can represent a separate spreadsheet in a collection of spreadsheet documents, for example, and can include a set of row models 212 and column models 214. For example, the row models 212 and the column models 214 can be represented as arrays. Each of the sheet models 210 can further include a set of cell models 216. For example, the cell models 216 can be represented as a sparsely populated two-dimensional array indexed by row and column ids. In some implementations, each of the sheet models 210 can include additional metadata, such as information related to frozen rows and columns, hidden rows and columns, merges, conditional formats, embedded object managers, maps of ids to positions, and the like.

Each of the cell models 216 can include a set of cell components 218. For example, each of the cell components 218 can include information such as cell types, raw values, display values, format models, formula models, hyperlinks, data validation, conditional formatting, mutation methods, and view annotations (e.g., properties that may be cached on cell objects for lookup). In some implementations, each cell type (e.g., text, hyperlink, comment, and the like) may include an associated renderer that may convert the cell to an HTML/DOM (HyperText Markup Language/Document Object Model) representation via rendering. Format models may include such properties as number formats, cell styling including colors and fonts, and the like. Formula models may also include formulas using R1C1 notation, and may include methods for formula conversion. Format models can be implemented using Cascading Style Sheet (CSS) classes, CSS class maps, and inline style objects, for example. Formula models can be stored in a map on a client device, for example, so that cells may share references to the formulas. In some implementations, format models may also be stored in a map on a client device. In some implementations, cell models and format models may follow the NULL object pattern. For example, shared singleton objects may exist for a default blank cell and for a default blank format. Model data and components may be provided by a mega-model 250 (whose name indicates that the model is a super-set of the other models or views) stored on a remote server system via a connection to a network 240 (e.g., the internet).

The view 206A can include one or more view items 220 that may enable the user to interact with the application 200, such as menu bars, tool bars, context menus, chat panes, dialogs, and the like. The view 206A can also include a sheet menu 222 that presents information and control options related to one or more of the sheet models 210, and one or more of a set of per views 224. For example, one of the per views 224 may be associated with a corresponding one of the sheet models 210. Each of the per views 224 may include components or controls such as freezebars, resizers, selectors, active cell indicators, and navigation tools (e.g., scrollbars and the like).

The controller 208A can include one or more controllers 230 that may listen for and handle user interactions with one or more of the view items 220. In some implementations, each of the controllers 230 may be associated with a corresponding one of the view items 220. For example, menu bar controllers may listen for and handle user interactions with menu bar view items (e.g., relating to various actions that a user would typically take from a row of menu selections), tool bar controllers may listen for and handle user interactions with tool bar view items, context menu controllers may listen for and handle user interactions with context menu view items, and so forth.

The controller 208A can also include a sheet controller 232 that may listen for and handle user interactions with the sheet menu 222. In addition, the controller 208A can include a set of per view controllers 234, where each of the controllers 234 is configured to listen for and handle user interactions with a corresponding view in the set of per views 224. Each of the per view controllers 234 may include various controller types, such as key controllers for intercepting and interpreting keyboard input, mouse controllers for intercepting and interpreting mouse input, and model change controllers for intercepting and interpreting model change events.

Generally, the controllers included in the controller 208A can transform user-generated events into model and view mutations. For example, based on a user action, a relevant controller (e.g., a controller configured for handling the action) may receive one or more events associated with the action and make transient changes to the view 206A before the user action is committed. Then, based on the event properties, the relevant controller can construct a command to mutate the model 204A, execute it, and send it to the remote server system that hosts the mega-model 250 via the network 240.

Many possible user interactions with the application 200A are possible, including interactions included in single-user sessions and in multiple-user sessions. For purposes of illustration, a series of example user interactions with the application 200A are described here. For example, to enter data into the spreadsheet document 202, the user may proceed by using a computer mouse to select a desired spreadsheet cell 260 by clicking on the cell. A mouse controller included in the per view controllers 234 (e.g., a per view controller associated with the active sheet of the document 202) can listen for an event associated with the mouse positioning input and the mouse click input, and upon intercepting it, can modify the view 206A (e.g., a per view associated with the active sheet) to provide the user with a visual indicator for the selection. For example, the selected spreadsheet cell 260 may be highlighted, assigned a different border, assigned a different color, or another such modification.

Using a keyboard, the user may enter a desired value into the spreadsheet cell 260. A keyboard controller included in the per view controllers 234 can listen for events associated with the keyboard input, and upon intercepting them, can modify the view 206A to provide the user with a visual indicator for the input. For example, as the user types data into the spreadsheet cell 260, the cell may be visually updated to present the data to the user. Additionally, the keyboard controller can modify the model 204A to include entered data by writing the user input to the model. For example, one of the cell models 216 (e.g., a cell model associated with the spreadsheet cell 260) can be updated to include the entered data as the raw value. Additionally, the mega-model 250 may be updated to include the entered data, thus coordinating the model 204A with the mega-model 250. For example, changes to the model 204A may be transmitted to the mega-model 250 via a connection to the network 240. In some implementations, changes may be sent periodically (e.g., once every second, once every 10 seconds, once every minute, or another appropriate time interval). In some implementations, changes may be sent based on user activity (e.g., removing focus from a spreadsheet cell, clicking a save button, or some other action).

Next, for example, the user may modify the formatting of data presented in the spreadsheet cell 260. By interacting with one of the view items 220 or with the sheet menu 222, the user can indicate a desired formatting change (e.g., a change such as changing regular numbers to currency, changing a font to bold, changing a color to blue, and the like). One of the controllers 230 or the sheet controller 232 can listen for user interaction with the view 206A, and upon detecting the interaction, can modify the model 204A to include the formatting change. For example, one of the cell models 216 (e.g., the cell model associated with the spreadsheet cell 260) can be updated to include the change. A model change controller included in the per view controllers 234 can listen for events associated with the model 204A and can send a request to the view 206A to update accordingly (e.g., by rendering a display value included in the cell model associated with the spreadsheet cell 260). In some implementations, the model change controller may also handle model change events that result from collaborative model changes.

Additionally, for example, the user may associate the spreadsheet cell 260 with a formula. Model-view-controller interactions within the application 200A for entering the formula and associating the formula with the spreadsheet cell 260 may be generally similar as when modifying formatting. For example, a model change controller included in the per view controllers 234 can detect the model change associated with the entered formula, and can send a request to the view 206A to perform a display update. As part of the display update, for example, the view 206A may convert the entered formula to a literal value, and may render the spreadsheet cell 260 to include the literal value.

Particular steps may be taken to permit a user to interact with a formula for a cell when the view might only include a literal value for the cell. In such a situation, a text entry area or box may be displayed adjacent to a viewport on a browser, and when a user places a cursor over a particular cell, the model data for the cell may be obtained and provided in the text entry area, while the literal value is shown in the cell in the viewport. As the user changes the formula, that change may be propagated to the model on the client (with changes to downstream cells) and may be rendered back into the DOM.

The user may also elect to view a different portion of the spreadsheet document 202 than she is currently viewing in the viewport. For example, by interacting with a scrollbar 206 that is associated with the spreadsheet document, the user may indicate a desire to view spreadsheet data beyond the current view. One of the per view controllers 234 (e.g., the per view controller associated with the active sheet) can listen for user interaction with the view 206A or other appropriate component (e.g., the visual portion of the scrollbar 262), and upon detecting the interaction (e.g., via a computer mouse), can request for the view 206A to redraw itself. If the user specifies a small amount of scrolling, the view 206A may cause itself to be displayed by the browser. For example, a buffer area of cells may be maintained in the model 204A around the cells that are displayed in the visible area of the spreadsheet document 202. If the amount of scrolling specified by the user is determined by the view 206A to be within the bounds of the buffer area of cells, the spreadsheet cells may be rendered using the cached data. If the user specifies a larger amount of scrolling, such that the scrolling specified by the user is determined by the view 206A to be outside of the bounds of the buffer area of cells, for example, additional spreadsheet data from the mega-model 250 may be downloaded via the network 240. Thus, the model 204A may be updated with information that is related to additional spreadsheet cells, and the spreadsheet cells may be rendered using the downloaded data.

Figure 3:
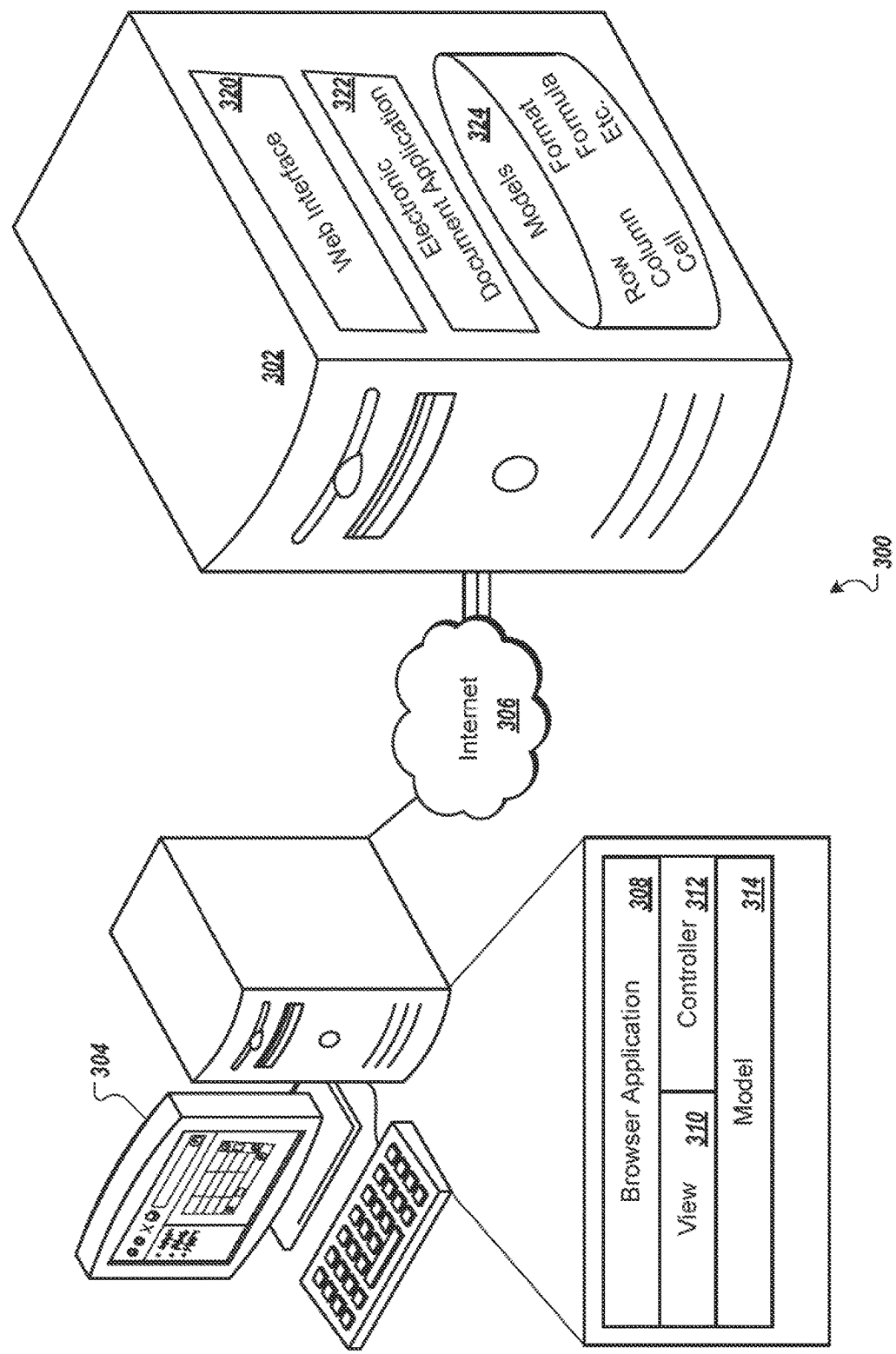
FIG. 3 shows example client and server components for an on-line spreadsheet application.

FIG. 3 shows example client and server components for an on-line spreadsheet application. In general, a system 300 coordinates a model for a document that is stored and updated at a server system, and a corresponding model that is stored and updated at one or more clients (which each are programmed so as to modify their models in ways similar to each other, so that the models match each other and are synchronized). Each client renders a portion of the model that is located around a current user viewport in a browser that displays content from the model, and a controller receives user inputs in order to change the manner in which the model is displayed, and to potentially change the model.

In the figure, the system 300 includes a server system 302 and a client system 304 in communication over a network 306 (e.g., the internet). The system 300 can be used to present an electronic document via a browser application 308 (e.g., a web browser) that is executable on the client system 304.

The client system 304 can include such system components as processors, memory storage, user input devices (e.g., computer mice, touchpads, touch screens, microphones, cameras and the like) and output devices (e.g., display monitors, audio speakers, printers, and the like). The server system 302 can include single or multiple computer servers (e.g., a server farm or data center) for hosting and processing data (e.g., cloud data and applications).

A user of the client system 304 can access the on-line application by directing the browser application 308 to a web site that is hosted by the server system 302. Receiving a client request for the application, the server system 302 can provide a web interface 320 to the client system 304 via the network 306 (e.g., via transfer of HTML that calls JavaScript code, among other things). The web interface 320 can implement any appropriate number of embedded applications and widgets, including an electronic document application 322 (e.g., a spreadsheet application). The browser application 308 can receive the web interface 320 and the electronic document application 322 and can visually present the interface 320 including the application 322 to the user. A user of the client system 304 may then interact with the electronic document application 322 using the web interface 320 presented by the browser application 308. For example, a newly created electronic document may or may not include data. The electronic document 322 may also include controls and utilities that enable the user to populate created documents with data.

The server system 302 can also provide the client system 304 with data that is associated with the electronic document application 322. Considering a spreadsheet application, for example, such data can be stored and maintained in one or more data stores that implement one or more data models 324. For example, the user may have access to any appropriate number of on-line spreadsheet documents (e.g. a private spreadsheet for tracking monthly expenses, a shared spreadsheet for updating research data maintained by multiple co-workers, a read-only spreadsheet for posting game statistics to members of a sports team, etc.), and each of the spreadsheet documents may be hosted by the server system 302 and may be based on one or more of the models 324. In some implementations, the data models 324 can include a hierarchy of sub-models, including row models, column models, cell models, format models, formula models, and the like. The server system 302 may provide the client system 304 with relevant model data for an accessed document, or with a portion of the relevant model data.

The browser application 308 can include components for providing an electronic document (e.g., a spreadsheet), including a view 310, a controller 312, and a model 314. The model 314 can define the electronic document. For example, the model 314 can include model data provided by the server system 302 and can include data provided by or created by the client system 304. The view 310 can implement a document object model (DOM) as a rendered representation of a sub-portion of content in the model 314 and can be arranged to be displayed by the browser application 308. For example, the browser application 308 can visually display at the client system 304 a small portion of a large spreadsheet document, and may provide the user with visual controls (e.g., for selection, data manipulation, navigation, and the like) to enable the user to interact with the spreadsheet. The controller 312 can interpret user interactions with a display of the view 310 and can cause different sub-portions of the electronic document object model to be displayed in coordination with the user interactions. For example, by interacting with a navigation control (e.g., a scrollbar), the user can express an intent to navigate to a particular sub-portion of the spreadsheet. The controller 312 can interpret the user interaction, and can cause the view 310 to present a different portion of the model 314.

Although a single client is shown here for clarity, multiple chants may be provided, and concurrent editing of the document represented by the model 314 may occur from particular ones of those multiple clients. In particular, each character entered by each user, and the position of each user's cursor may be repeated up to the server system and then passed to each other client system. The client systems may each be programmed to maintain their models in coordination with the server system, and by extension then, in coordination with each other. Each may also follow common rules for generating DOM data from the sub-model that they are currently storing, though each client need not store the same sub-model, such as when a document is very long and the different users are in far-separated portions of the document, and thus storing sub-models for those different portions.

Figure 4:
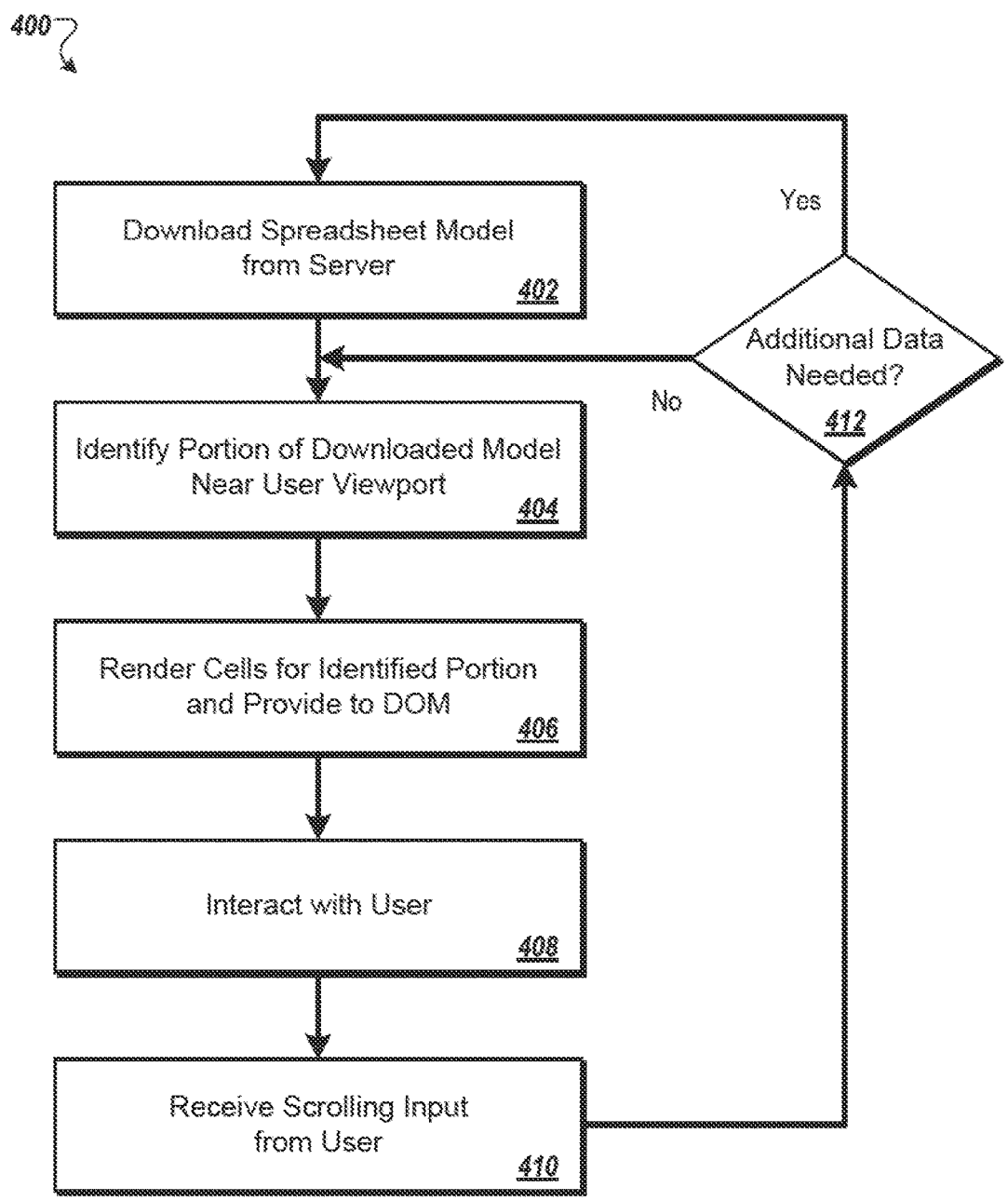
FIG. 4 is a flow chart of an example process for managing the display of a spreadsheet that is too large to be completely displayed at one time.

FIG. 4 is a flow chart 400 of an example process for managing the display of a spreadsheet that is too large to be completely displayed at one time. In some implementations, actions represented in the flow chart 400 may be performed by a system such as the computer-implemented system 300 as shown in FIG. 3. The process for managing the display of a large spreadsheet is described here; however, other types of large electronic documents may also be managed and displayed.

Referring to FIG. 4, the process begins in this example at box 402, where a spreadsheet model is downloaded from a server. For example, using a web browser, a user can navigate to a web page that includes an embedded spreadsheet document. As another example, a user may navigate to a directory page that includes links to any appropriate number of previously created spreadsheet documents. The user may select a previously created spreadsheet document, or may create a new spreadsheet document.

For a small spreadsheet document (e.g., a document that includes a limited number of rows and columns, a limited amount of data, or some such qualifier), the entire spreadsheet model may be provided by the server. For a large spreadsheet document, a sub-portion of the spreadsheet content may be provided to the server. For example, considering a spreadsheet document that contains 100,000 rows, the server may initially provide a subset of the rows (e.g., the first 10,000). As another example, considering a spreadsheet document that contains 1000 columns, the server may initially provide a subset of the columns (e.g., the first 50).

The act of determining a sub-portion of the spreadsheet content to provide may be related to a particular amount of data (e.g., column or row counts, number of bytes, or the like), and may be based at least in part on attributes of the client computer device that requests the data (e.g., processing, memory, connection speed, and the like). For example, a desktop workstation with a relatively large amount of memory and processing power may be provided with a large sub-portion of the model or the entire model. As another example, a smartphone with a relatively small amount of memory and processing power may be provided with a relatively smaller sub-portion of the model.

The portion of the downloaded model near a user viewport can be identified at box 404. For example, the web browser can be configured to execute computer code for visually presenting a portion of the spreadsheet document in the viewport (i.e., a section of a user display associated with the client device). The viewport size and location may vary, depending at least in part on attributes of the display. For example, a desktop workstation may include a large monitor that is capable of presenting a large viewport. As another example a smartphone may include a relatively smaller display screen that is capable of presenting a relatively smaller viewport. In some implementations, the size of the viewport may be configurable by the user. For example, the user may choose to resize the web browser, and the included viewport may be proportionally resized by application code executed within the web browser. As another example, the user may choose to resize the viewport itself using one or more controls associated with the viewport.

The size of the viewport may be used as a factor in determining an amount of data to be presented in a view. For example, a large viewport may be capable of displaying relatively more spreadsheet rows and columns than a smaller viewport. By considering the viewport size, as well as row heights and column widths, for example, application code executed by the web browser may determine a number of spreadsheet rows and columns to be presented.

The portion of the downloaded model near the user viewport may be related to use of the spreadsheet document. For example, when initially working with the spreadsheet, the portion near the user viewport may be in the upper-left-hand portion of the spreadsheet (i.e., row 1, column 1). As another example, the portion of the document model near the user viewport may correspond with a saved spreadsheet location from a previous user session. For example, the client or the server may save information associated with the last portion of the spreadsheet that was viewed by the user, and may provide this information to the web browser upon subsequent user sessions. As another example, multiple users working with the spreadsheet document may each have such session information saved for use in future sessions. Generally, the portion of the model near the user viewport can change. For example, during a user session, the user may navigate to various portions of the spreadsheet document, causing different portions of the model to be near the user viewport.

At box 406, cells can be rendered for the identified portion of the model, and can be provided to the DOM. For example, based at least in part on the viewport size and the number of rows and columns identified as being suitable for presentation, the web browser can execute computer code to render cells near the viewport and can provide the rendered cells to the DOM. In some implementations, a buffer area of cells around the cells to be displayed in the viewport may be rendered and provided to the DOM. For example, a bounding range for the buffer area can be determined, and cells may be rendered in the model within the bounding range. Spreadsheet cells determined to be within the viewport can be presented to the user. For example, computer code executed by the web browser may visually display the spreadsheet cells, in addition to controls enabling the user to interact with the cells.

At box 408, the user may interact with the spreadsheet document. For example, by interacting with the spreadsheet cells and various associated controls, the user may edit cell data, format cell data, merge cells, include formulas, embed objects, add comments, add rows and columns, hide rows and columns, freeze rows and columns, and perform other spreadsheet operations. A view component (e.g., included in a MVC structure) associated with the viewport can provide a public interface for controllers. For example, the view may include methods for inserting, deleting, and moving rows and columns, for freezing and hiding rows and columns, for setting the selection and active cell, and other such spreadsheet operations. Generally, various controllers may listen for events on the view, execute commands, and instruct the view to mutate. In some instances, a controller may instruct the view to redraw itself based on the current model state. In some instances, a more specific mutation method on the view may enable the view to optimize mutations. For example, instead of setting the active cell by redrawing, the view may set the active cell by modifying the DOM directly.

Semantic changes that the controller specifies for the model may be encapsulated in a command. For example, each command may accept a certain number of parameters in its constructor and may implement an exec method that mutates the model and dispatches an event on the model indicating a mutation has taken place. In some implementations, commands may operate at a higher semantic level than mutation methods on the model itself. Commands may also provide an abstraction for serializing server requests. For example, commands can be used for setting values, setting formats, inserting ranges, and other such spreadsheet operations. When a command is executed, for example, the command can fire an event on the model. In some implementations, a controller may listen for events on the model and instruct the view to update accordingly. The controller may also handle model change events that are the result of collaborative model changes, for example.

Scrolling input is received from the user at box 410. Using synthetic scroll bar controls associated with the viewport, for example, the user may indicate a desire to view a different portion of the spreadsheet. For example, the user may want to navigate to the right or left for viewing different column data, or up or down for viewing different row data.

At box 412, a determination is made of whether additional data is needed. For example, if the user scrolls a small amount, such that the resulting position in the spreadsheet document corresponds with a set of spreadsheet cells associated with model data already present at the client device additional model data may not be needed. In this instance, the portion of the model near the user viewport can be identified (box 404), and the cells for the identified portion can be rendered and provided to the DOM (box 406).

As another example, if the user scrolls a large amount, such that the resulting position in the spreadsheet document corresponds with a set of spreadsheet cells associated with model data not present at the client device, additional model data may be needed. In this instance, additional spreadsheet model data can be downloaded from the server (box 402), the portion of the model near the user viewport can be identified (box 404), and the cells for the identified portion can be rendered and provided to the DOM (box 406). In some implementations, additional model data may be progressively added to a cache as it is downloaded. In some implementations, previously downloaded model data may be cleared from the cache. For example, unused model data may be cleared from the cache to provide space for recently downloaded model data.

Figure 5A:
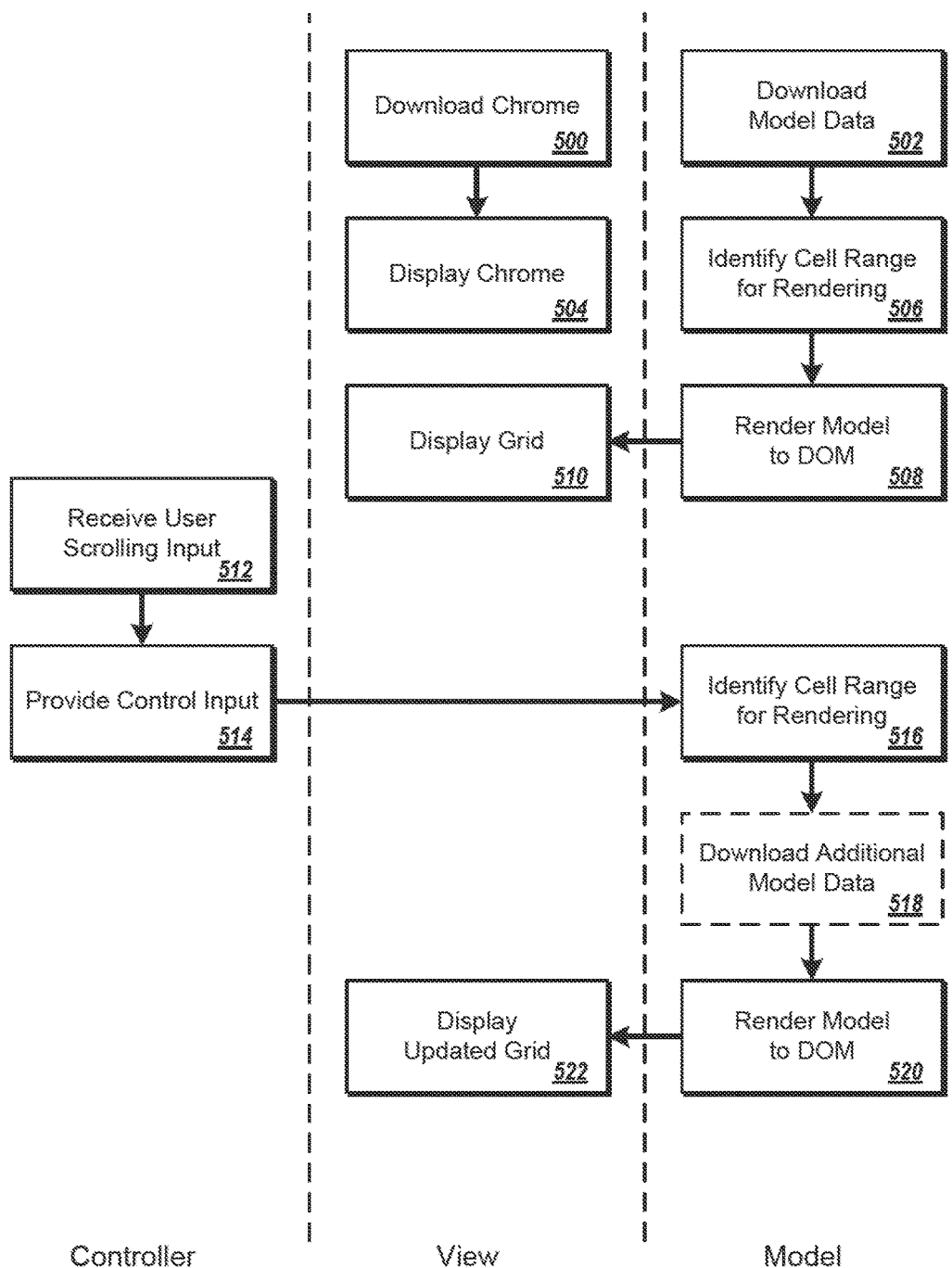
FIGS. 5A and 5B are swim lane diagrams showing techniques for managing the display of a document that is too large to be fully displayed at one time.
Figure 5B:
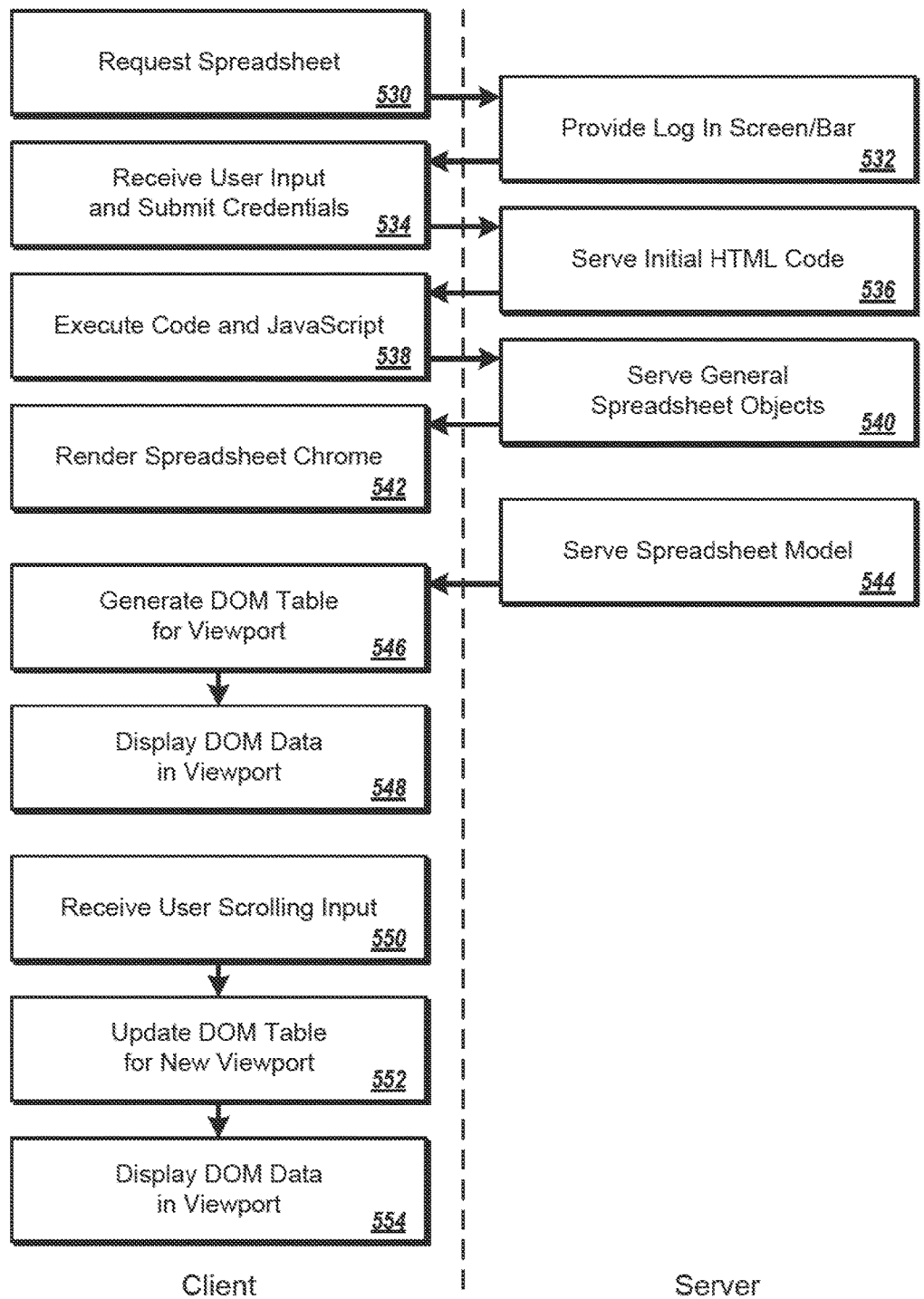

FIGS. 5A and 5B are swim lane diagrams showing techniques for managing the display of a document that is too large to be fully displayed at one time. In general, the particular actions are shown in these examples as being performed by particular structural components, and the processes generally show steps for interacting with a user via a browser-presented document. In some implementations, actions represented in FIGS. 5A and 5B may be performed within a system such as the computer-implemented system 300 (shown in FIG. 3). Interaction with an on-line spreadsheet document is described here; however, other kinds of network-accessible documents may also be interacted with.

Referring to FIG. 5A, interactions between a model, view, and controller are shown. In some implementations, operations associated with the interactions may be executed by one or more computer applications such as the application 200A (shown in FIG. 2B). For example, the application(s) may operate within a web browser or another sort of client application configured to receive data from a remote server via a network such as the Internet. In some implementations, the interactions may be performed by a client device such as a device included in the client system 302 (shown in FIG. 3), and will be described as such for clarity.

At box 500, application chrome (i.e., the visible graphical interface features of an application) can be downloaded from the remote server and provided to the view. For example, the application chrome may be used by the web browser that is operating on the client device for presenting spreadsheet content and for enabling users to interact with the content. In some implementations, an application container that renders the chrome may be embeddable as a standalone widget in a web page displayed by the web browser. For example, a developer may embed one or more of the application containers in a web page to provide spreadsheet functionality to users of the web page. In some implementations, an object (e.g., a spreadsheet document) included in an embedded application container may be enabled to serialize its current state to JavaScript Object Notation (JSON) such that clients may save the object and re-instantiate it later.

In some implementations, while chrome is downloaded to the view (box 500), model data may be downloaded at box 502. For example, spreadsheet controls such as document bars, menu bars, and toolbars may be downloaded (box 500) and visually displayed (box 504) while model data is downloaded (box 502). Thus, in some implementations, portions of the chrome and the model data may be progressively downloaded in a manner that overlaps in time.

At box 504, chrome is displayed. For example, the document bars, menu bars, and toolbars may be displayed to the user in the web page application container. In some implementations, the application container may be displayed for a period of time without data. For example, controls for interacting with the spreadsheet may be displayed before the spreadsheet before the associated spreadsheet data is displayed. Generally, the controls are inoperable during the time period, and generally, the period of time is short (e.g., seconds, or fractions of seconds). Thus, in some implementations, the spreadsheet document may appear to the user to be usable before it is functionally usable. A progress indicator or some other visual indicator may be displayed to the user to indicate document status as the document loads, for example.

Once model data is downloaded (502), a cell range is identified for rendering at box 506. For example, the cell range may be related to a default location (e.g., the upper-left-hand corner of the spreadsheet), or a user-specific location. User-specific locations may include such spreadsheet locations as the last spreadsheet location accessed during a previous spreadsheet session for a particular user, or a frequently-accessed spreadsheet location for the user, to name a couple of possibilities.

At box 508, the model is rendered to the DOM. For example, a sub-portion of the downloaded document content may be rendered. In some implementations, the amount of rendered content can be based on the display size of the application container. For example, spreadsheet cells determined to be viewable within a viewport associated with the container may be rendered. In some implementations, additional cells in a border range around the viewable portion may also be rendered. The grid may be displayed at box 510. For example, the view can determine a set of spreadsheet cells for display and can populate a chrome grid object with data from the model.

In some implementations, upon the completion of chrome and data downloads, the user may interact with the document. At box 512, the controller receives scrolling input. For example, by interacting with a chrome scrollbar, the user may indicate a desire to scroll to a different portion of the spreadsheet document. The interaction may be detected by the controller, and control input may be provided from the controller to the model at box 514. Receiving the input at box 516, the model identifies a cell range for rendering. For example, based on a change in scrollbar position, the model can determine a corresponding change in model position. In some implementations, the determined positional change may be proportional. For example, by positioning a vertical scrollbar at a halfway point, the user may indicate a desire to view row 50,000 of a spreadsheet containing 100,000 rows.

At box 518, additional model data is optionally downloaded from the remote server. For example, if the user scrolls a small amount, such that the resulting position in the spreadsheet document corresponds with model data presently included in the model at the client device, additional model data may not be needed. If the resulting position in the spreadsheet document corresponds with model data not at the client device, additional model data may be needed. In either case, based on the document position, for example, a corresponding portion of the model is rendered to the DOM at box 520. Based on the model information rendered to the DOM the view then displays the updated spreadsheet grid at box 522.

Referring now to FIG. 5B, interactions between a client and a server are shown. The interactions may generally track an example in which a user at the client loads and interacts with a document such as a spreadsheet, whose data is served from the server system. In some implementations, the interactions may be performed between a client device such as a device included in the client system 302 and a server system such as the server system 304 as shown in FIG. 3, and will be described as such for clarity.

At box 530, the client requests a spreadsheet document. For example, the user can direct a browser application executed by the client to a web site hosted by the server (where a server may refer to a single computer server or multiple computer servers working in tandem with each other). Using the web site, for example, the user may create, upload, view, and modify any number of documents, and may share and collaboratively maintain documents with other users. In some implementations, the web site can maintain persistent storage for the documents, and the user can access the documents in one or more sessions.

Receiving the spreadsheet request, the server provides to the user a log in screen/bar at box 532. For example, the log in screen/bar can be presented to the user in a web page associated with the web site. At box 534, the client receives user input and submits related credentials. For example, the user may provide a user name and password, or other such information. As another example, an IP address that is associated with the client, or web cookies stored on the client, may be provided in association with information provided by the user. The user information and credentials are then provided to the server, for example. In some implementations, based on the provided information, the server may perform client authentication.

Upon authentication, for example, the server can provide a list of documents for selection by the user, or may provide a particular document. For example, the document may by a spreadsheet provided by an embedded application (or widget) included on a web page. At box 536, initial HyperText Markup Language (HTML) code is served to the user. For example, Cascading Style Sheets (CSS) may be provided for defining the presentation of a web page including the embedded application. At box 538, the web page executes code and JavaScript provided by the server. For example, based on the executed code, the web page may make a Hypertext Transfer Protocol (HTTP) request to the server related to the embedded applications.

In some implementations, the embedded application and associated data may be provided using such technologies as JavaScript and HyperText Markup Language (HTML). As shown, at box 540, general spreadsheet objects related to the embedded application are served to the client, and at box 542, spreadsheet chrome is rendered by the web browser. For example, as opposed to blocking on a JavaScript bundle download, an initial chunk of HTML is initially provided. Thus, an initial view can be rendered when the HTML is received by the client. After the JavaScript has loaded, for example, the view may be redrawn to make the embedded application usable.

In some implementations, objects and data may be provided separately. As shown, at box 544, a spreadsheet model is served to the client. The spreadsheet model may include spreadsheet data and presentation information, for example. In some implementations, the entire model may be provided by the server, or a sub-portion of the model content.

At block 546, a DOM table is generated for the embedded application viewport. For example, a portion of the spreadsheet model may be visually displayed to the user through a viewport that is included on the webpage. After the spreadsheet chrome is rendered within the web browser, for example, the model may be written as a Java Script Object Notation (JSON) block. When the JavaScript bundle loads, for example, the embedded application may parse the model and render the view.

In some implementations, the view may render itself given the model, a start row, and a start column. For example, the size of a display monitor associated with the client device, calculated row heights, and calculated column widths may be used to determine a number of rows and columns for rendering. Iterating through relevant model sections (e.g., row 50 to row 90, columns A through H), for example, the view can construct a string of HTML corresponding with the data. When the string is prepared, the view may use the string to generate an HTML table that, when displayed, visually represents the data in the client data model for a sub-portion of content. At block 548, the DOM data is displayed in the viewport.

The client can receive scrolling input at block 550. For example, by interacting with a scrollbar control associated with the embedded application, the user may indicate a desire to scroll to a different portion of the spreadsheet document. At box 552, the DOM table can be updated for a new viewport. For example, using an updated start row and start column, the view reiterate through the relevant model sections, and can construct a new string of HTML corresponding with the data. The view may then use the string to generate a new HTML table, for example, and at block 554, display the DOM data in the viewport.

Figure 6:
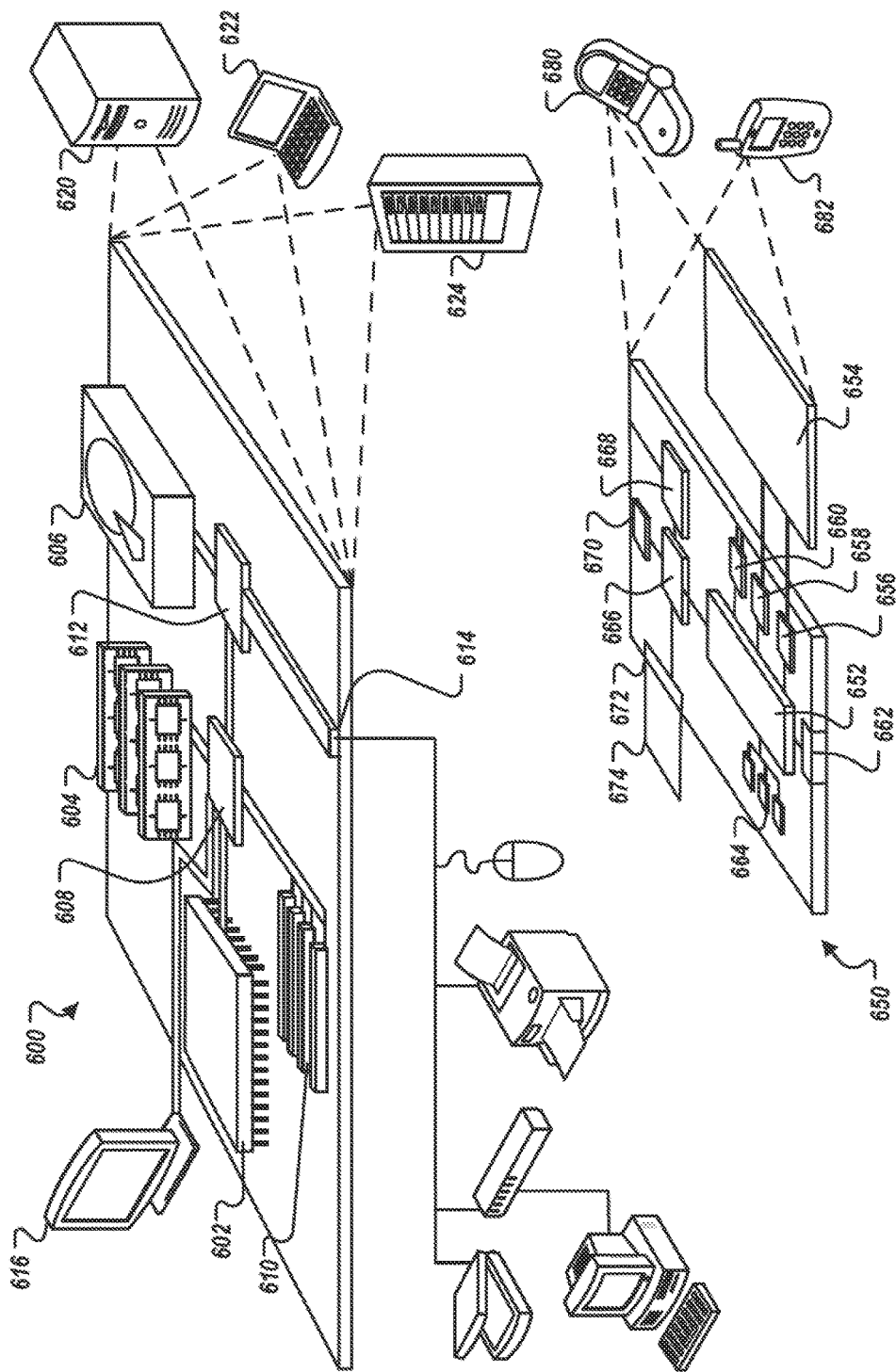
FIG. 6 shows an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 60$ connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive, operations for the computing device 600, while the low speed controller 612 manages lower bandwidth-intensive operations. Such avocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interlace. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or CPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g. in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method of presenting an electronic document via a web browser, the method comprising:
    maintaining on a computing device a client data model of the electronic document, the client data model comprising data that defines content of the electronic document and formatting of the content of the electronic document;
    rendering a first sub-portion of content of the electronic document from the client data model to a document object model (DOM) for the web browser;
    providing the DOM to the web browser, for the web browser to display a view of the electronic document from the DOM;
    rendering a map representing the entire electronic document; and
    providing the map to the web browser for the web browser to display and indicate which portion of the electronic document is displayed in the view of the electronic document, wherein the map is rendered as a superimposition over the view of the electronic document to receive a selection of a portion of the map for an update of the view of the electronic document.

2. The method of claim 1, wherein the map is displayed during scrolling of the view.

3. The method of claim 1, further comprising receiving a user selection on the map, determining a bounding range for a portion of the model that corresponds to the user selection, and rendering into the DOM content in the model that is within the bounding range.

4. The method of claim 1, wherein the first sub-portion includes a predetermined amount of content.

5. The method of claim 1, wherein the view comprises a second sub-portion that is a sub-portion of the first sub-portion and the first sub-portion includes a buffer area positioned around the second sub-portion and having a bounding range.

6. The method of claim 5, wherein the bounding range is asymmetrical around the view of the electronic document and is biased in a direction based on a user scrolling history, so that the DOM includes more area on a first side of the view than on a second side of the view that is opposed to the first side.

7. The method of claim 1, wherein the electronic document comprises a spreadsheet and the content comprises content for cells in the spreadsheet.

8. The method of claim 7, wherein one or more cells in the first sub-portion of content define one or more formulas, and wherein rendering the one or more cells comprises converting each of the one or more formulas to a literal value.

9. The method of claim 1, wherein maintaining the client data model of the electronic document comprises downloading a data model of the electronic document from a remote server system, and communicating with the remote server system so that changes made by a user of the computing device to the electronic document are reflected in a version of the data model that is stored at the remote server system.

10. A non-transitory computer readable storage medium, comprising a processor coupled to memory for presenting an electronic document via a web browser executable on a computing device further comprising:
    a client data model of the electronic document, wherein the client data model comprises data that defines content of the electronic document and formatting of the content of the electronic document;
    a document object model (DOM) comprising a rendered representation of a first sub-portion of content in the client data model and arranged to be displayed by the web browser;
    a view of the electronic document from the DOM;
    a map representing the entire electronic document; and
    a controller to:
    interpret user interactions with a display of the view of the electronic document, cause different sub-portions of the electronic document to be displayed in coordination with the user interactions, and cause the map to be displayed to indicate which portion of the electronic document is displayed in the view of the electronic document, wherein the map is rendered as a superimposition over the view of the electronic document to receive a selection of a portion of the map for an update of the view of the electronic document.

11. The non-transitory computer readable storage medium of claim 10, wherein the controller is further configured to cause the map to be displayed during scrolling of the view.

12. The non-transitory computer readable storage medium of claim 10, wherein the controller is further configured to receive a user selection on the map, determine a bounding range for a portion of the client data model that corresponds to the user selection, and cause the DOM to include content in the client data model that is within the bounding range.

13. The non-transitory computer readable storage medium of claim 10, wherein the first sub-portion includes a predetermined amount of content.

14. The non-transitory computer readable storage medium of claim 10, wherein the view further comprises a second sub-portion that is a sub-portion of the first sub-portion and the first sub-portion includes a buffer area positioned around the second sub-portion and having a bounding range.

15. The non-transitory computer readable storage medium of claim 14, wherein the bounding range is asymmetrical around the view of the DOM and is biased in a direction based on a user scrolling history, so that the DOM includes more area on a first side of the view than on a second side of the view that is opposed to the first side.

16. The non-transitory computer readable storage medium of claim 10, wherein the electronic document comprises a spreadsheet and the content comprises cells in the spreadsheet.

17. The non-transitory computer readable storage medium of claim 16, wherein one or more cells in the first sub-portion of content define one or more formulas, and wherein the rendered representation comprises literal values of outputs of the formulas.

18. The non-transitory computer readable storage medium of claim 10, further comprising an electronic document model that is a super-set of the client data model and is managed by a hosted server system, and wherein the system is programmed to communicate with the hosted server system so that changes made by a user in the DOM are reflected in a version of the electronic document model managed by the hosted server system.

19. A system of presenting an electronic document via a web browser, the system comprising:

a memory to store a client data model of the electronic document, the client data model comprising data that defines content of the electronic document and formatting of the content of the electronic document; and a processing device, coupled to the memory, to:

render a first sub-portion of content of the electronic document from the client data model to a document object model (DOM) for the web browser;

provide the DOM to the web browser, for the web browser to display a view of the electronic document from the DOM;

render a map representing the entire electronic document; and provide the map to the web browser for the web browser to display and indicate which portion of the electronic document is displayed in the view of the electronic document, wherein the map is rendered as a superimposition over the view of the electronic document to receive a selection of a portion of the map for an update of the view of the electronic document.

* * * * *